(12) United States Patent
Sathe et al.

(10) Patent No.: US 8,742,817 B2
(45) Date of Patent: Jun. 3, 2014

(54) CONTROLLING IMPEDANCE OF A SWITCH USING HIGH IMPEDANCE VOLTAGE SOURCES TO PROVIDE MORE EFFICIENT CLOCKING

(75) Inventors: Visvesh S. Sathe, Fort Collins, CO (US); Samuel D. Naffziger, Fort Collins, CO (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 13/601,155

(22) Filed: Aug. 31, 2012

(65) Prior Publication Data

US 2014/0062563 A1 Mar. 6, 2014

(51) Int. Cl.
G06F 1/04 (2006.01)
H03K 3/00 (2006.01)

(52) U.S. Cl.
USPC ........... 327/291; 327/108; 327/109; 327/110; 327/295; 327/299

(58) Field of Classification Search
USPC ......... 327/291, 295, 298, 108, 109, 110, 111, 327/112
See application file for complete search history.

(56) References Cited

U.S. PATENT DOCUMENTS

| | | | |
|---|---|---|---|
| 6,025,738 A | 2/2000 | Masleid | |
| 6,088,250 A | 7/2000 | Siri | |
| 6,205,571 B1 | 3/2001 | Camporese et al. | |
| 6,310,499 B1 | 10/2001 | Radjassamy | |
| 6,882,182 B1 | 4/2005 | Conn et al. | |
| 7,082,580 B2 | 7/2006 | Zarkesh-Ha et al. | |
| 7,084,685 B2 | 8/2006 | Lin et al. | |
| 7,237,217 B2 | 6/2007 | Restle | |
| 7,702,944 B2 | 4/2010 | Chelstrom et al. | |
| 8,339,209 B2 | 12/2012 | Papaefthymiou et al. | |
| 8,362,811 B2 | 1/2013 | Papaefthymiou et al. | |
| 8,368,450 B2 | 2/2013 | Papaefthymiou et al. | |
| 8,400,192 B2 | 3/2013 | Papaefthymiou et al. | |
| 8,502,569 B2 | 8/2013 | Papaefthymiou et al. | |

(Continued)

FOREIGN PATENT DOCUMENTS

WO 95/19659 7/1995

OTHER PUBLICATIONS

U.S. Appl. No. 13/601,188, filed Aug. 31, 2012, entitled "Clock Driver for Frequency Scalable Systems," naming inventors Visvesh S. Sathe et al.

(Continued)

*Primary Examiner* — John Poos
(74) *Attorney, Agent, or Firm* — Abel Law Group, LLP (57) ABSTRACT

A clock system of an integrated circuit includes first and second transistors forming a switch that is used when switching the clock system between a resonant mode of operation and a non-resonant mode of operation. An inductor forms a resonant circuit with capacitance of the clock system in resonant mode. The switch receives a clock signal and supplies the clock signal to the inductor when the switch is closed and disconnects the inductor from the clock system when the switch is open. First and second high impedance voltage sources supply respective first and second voltages to the switch and a gate voltage of the first transistor transitions with the clock signal around the first voltage and a gate voltage of the second transistor transitions with the clock signal around the second voltage such that near constant overdrive voltages are maintained for the first and second transistors.

22 Claims, 4 Drawing Sheets

(56) References Cited

U.S. PATENT DOCUMENTS

| | | | |
|---|---|---|---|
| 2005/0057286 A1 | 3/2005 | Shepard et al. | |
| 2008/0303576 A1 | 12/2008 | Chueh et al. | |
| 2009/0027085 A1 | 1/2009 | Ishii et al. | |
| 2011/0084736 A1 | 4/2011 | Papaefthymiou et al. | |
| 2011/0084772 A1 | 4/2011 | Papaefthymiou et al. | |
| 2011/0084773 A1 | 4/2011 | Papaefthymiou et al. | |
| 2011/0084774 A1* | 4/2011 | Papaefthymiou et al. | 331/117 FE |
| 2011/0084775 A1 | 4/2011 | Papaefthymiou et al. | |
| 2011/0090018 A1 | 4/2011 | Papaefthymiou et al. | |
| 2011/0090019 A1 | 4/2011 | Papaefthymiou et al. | |
| 2011/0140753 A1 | 6/2011 | Papaefthymiou et al. | |
| 2013/0049824 A1 | 2/2013 | Kim et al. | |
| 2013/0154727 A1 | 6/2013 | Guthaus | |
| 2013/0194018 A1 | 8/2013 | Papaefthymiou et al. | |

OTHER PUBLICATIONS

U.S. Appl. No. 13/601,175, filed Aug. 31, 2012, entitled "Programmable Clock Driver," naming inventors Visvesh S. Sathe et al.

U.S. Appl. No. 13/601,119, filed Aug. 31, 2012, entitled "Constraining Clock Skew in a Resonant Clocked System," naming inventors Visvesh S. Sathe and Samuel Naffziger.

U.S. Appl. No. 13/601,138, filed Aug. 31, 2012, entitled "Transitioning from Resonant Clocking Mode to Conventional Clocking Mode," naming inventors Visvesh S. Sathe and Samuel Naffziger.

Non-final Office action in U.S. Appl. No. 13/601,119, dated Nov. 13, 2013, 16 pages.

Non-final Office action in U.S. Appl. No. 13/601,138, dated May 28, 2013, 26 pages.

Non-final Office action in U.S. Appl. No. 13/601,175, dated Aug. 1, 2013, 15 pages.

Non-final Office action in U.S. Appl. No. 13/601,188, dated Aug. 6, 2013, 16 pages.

Final Office action in U.S. Appl. No. 13/601,188, dated Nov. 18, 2013, 16 pages.

Ikeuchi, Katsuyuki et al. "Switched Resonant Clocking (SRC) Scheme Enabling Dynamic Frequency Scaling and Low-Speed Test," IEEE 2009 Custom Integrated Circuits Conference (CICC) pp. 33-36.

Foreign Search Report in PCT/US2013/057331, dated Nov. 27, 2013, 14 pages.

Foreign Search Report in PCT/US2013/057614, dated Nov. 11, 2013, 12 pages.

* cited by examiner

CONTROLLING IMPEDANCE OF A SWITCH USING HIGH IMPEDANCE VOLTAGE SOURCES TO PROVIDE MORE EFFICIENT CLOCKING

BACKGROUND

1. Technical Field

Disclosed embodiments relate to clocking systems and more particularly to switches used to switch between operational modes of the clocking system.

2. Description of the Related Art

Power consumption is a critical area of circuit design. That is particularly true for battery operated mobile systems. Many sources of undesired power loss can be found in integrated circuits such as leakage current in transistors and power loss due to undesirable resistive or capacitive loading. While power consumption is critical in mobile battery operated devices, power consumption is also important in other settings such as server farms where the power savings for each processor is multiplied many-fold. Thus, improving efficiency in integrated circuit operation is desirable to extend battery life and more generally to reduce energy consumption.

SUMMARY OF EMBODIMENTS

In some embodiments, an apparatus includes a switch coupled to receive a clock signal at an input node of the switch and supply the clock signal at an output node of the switch when the switch is closed. A first high impedance voltage source is coupled to supply a first voltage to a first gate node of a first transistor of the switch.

In some embodiments, a method includes supplying a first voltage from a first high impedance voltage source that is coupled to a gate of a first transistor of the switch. A second voltage is supplied from a second high impedance voltage source that is coupled to a gate of a second transistor of the switch. A clock signal is supplied to respective first current carrying nodes of the first and second transistors, and respective second current carrying nodes of the first and second transistors supply the clock signal to an inductor when the switch is closed.

In some embodiments, a clock system of an integrated circuit includes a switch that has a first and second transistor. The switch receives a clock and supplies the clock signal to an inductor when the switch is closed. The inductor forms a resonant circuit with capacitance of a clock system of the integrated circuit when the switch is closed and is disconnected from the capacitance of the clock system when the switch is open. First and second high impedance voltage sources supply respective first and second voltages to the switch such that a first near constant overdrive voltage is maintained for a first gate node of the first transistor and a second near constant gate overdrive voltage is maintained for a second gate node of the second transistor.

In some embodiments, low conducting resistance is achieved using a first circuit to selectively couple an inductor to a clock system. The circuit includes a first transistor coupling a first terminal of the inductor to a first supply voltage and a second transistor coupling the first terminal of the inductor to a second supply voltage.

BRIEF DESCRIPTION OF THE DRAWINGS

The embodiments disclosed herein may be better understood, and its numerous objects, features, and advantages made apparent to those skilled in the art by referencing the accompanying drawings.

The use of the same reference symbols in different drawings indicates similar or identical items.

DETAILED DESCRIPTION

Use of high impedance voltage sources for the gate terminals of the switch used in a resonant clocking system reduces the on-resistance of the switch for a given switch width and provides reduced leakage through the switch when the switch is open, thereby improving clocking efficiency across multiple frequencies.

Clock distribution networks account for a significant portion of overall power consumption in most high performance digital circuits today due to the vast amounts of parasitic capacitance that is connected to the clock network. One technique to implement a more energy-efficient clock distribution is resonant clocking.

Figure 1:
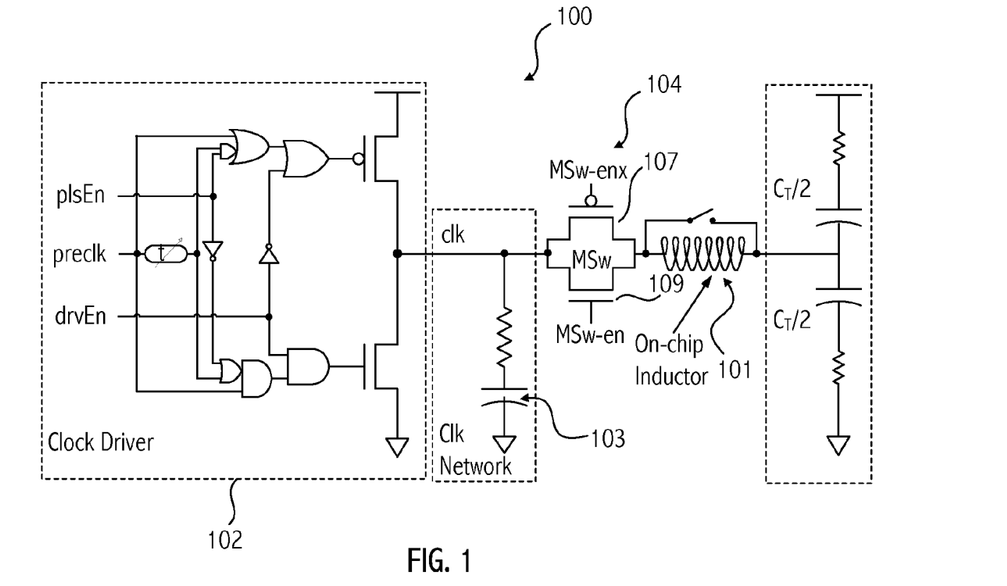
FIG. 1 illustrates a simplified model of a dual mode clocking system which supports both resonant and conventional clocking, according to some embodiments.

FIG. 1 illustrates a simplified model of a resonant clock system 100, according to some embodiments. The resonant clock system 100 may be part of a microprocessor, graphics processor, or other integrated circuit with a clock system. A distinct feature of the resonant clock system 100 is the use of an inductance (L) 101 that is connected in parallel with the parasitic network capacitance (C) 103. The role of the clock driver 102 is to replenish only the energy lost in the parasitic resistance of the LC system formed by the inductor 101 and parasitic network 103. Resonant clocking thus relies on efficient LC resonance to achieve energy efficiency. For an ideal inductor and interconnect, with no parasitic resistance, the clock network would oscillate with zero energy dissipation. Resonant clocking is most efficient at frequencies close to the resonant frequency.

Driving the resonant clock network at frequencies much lower than the resonant frequencies results in malformed clock waveforms that prevent correct operation of the processor. Modern microprocessors operate over a frequency range that cannot be supported by a purely resonant clock network designed to resonate at a single frequency. One way to address the wide frequency range uses dual clock modes of operation. At frequencies near the resonant frequency, the processor operates in the resonant clock mode. At frequencies outside the range where resonant clocking can be robustly operated, the clock system works in a conventional mode or non-resonant mode. Switching between resonant mode and non-resonant mode uses mode switch 104 that is in series with the inductor 101. Mode switch 104 is closed during resonant operation (rclk) to form an LC circuit and open in conventional mode (cclk) so as to disconnect the inductor from the clock system. For the purposes herein, mode switch 104 (MSw) is located as shown in FIG. 1. Using mode switch 104 provides the required functionality of a dual-mode clock, but increases the resistance of the LC tank, reducing resonant clocking efficiency.

Figure 2:
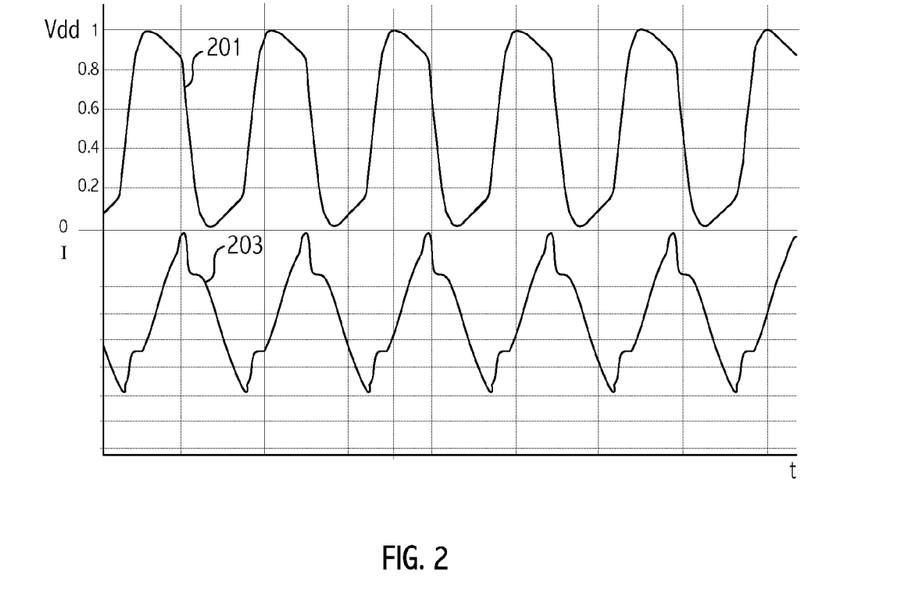
FIG. 2 shows example clock voltage and mode switch current waveforms, according to some embodiments.

FIG. 2 shows example clock voltage 201 and current waveforms 203 associated with mode switch 104. In the embodiment of FIG. 1, the mode switch 104 includes a pFET device 107 and an nFET device 109. The clock voltage transitions from ground to Vdd during its cycle, and as a result, the nFET (pFET) device sees a substantially reduced gate overdrive voltage when the clock signal approaches Vdd (ground), contributing to the increased resistance. The gate overdrive voltage is the voltage between the gate and source (Vgs) in excess of the threshold voltage. Thus, when the clock signal is its highest voltage, approximately Vdd, the difference between the source and the gate voltage (when the nFET is on) is at a minimum. The increased resistance contributed by the reduced gate overdrive voltage can be reduced by using a larger switch.

Figure 3:
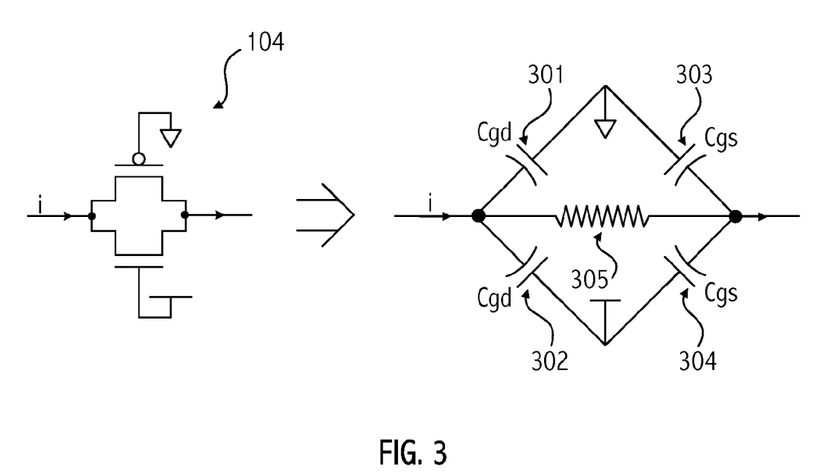
FIG. 3 illustrates a simplified model of a mode switch, according to some embodiments.
Figure 4:
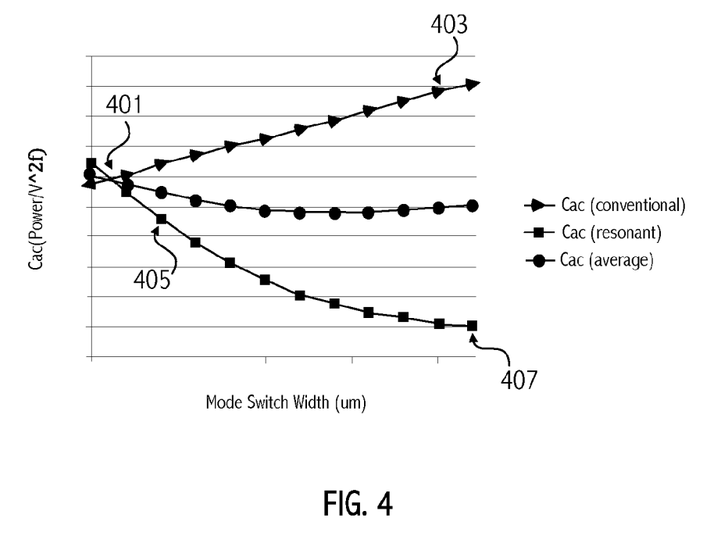
FIG. 4 illustrates mode switch sizing tradeoffs, according to some embodiments.

FIG. 3 shows a simplified diagram of the mode switch. Mode switch 104 includes the gate to drain capacitances (Cgd) 301 and 302 and the gate to source capacitances (Cgs) 303 and 304. In addition, the switch 104 includes resistance shown as resistance 305. A larger switch increases the capacitive loading on the clock network, increasing not only the dissipation in the conventional mode, but also in the resonant mode, due to the higher current flow through the resistance of mode switch 104 and the inductor 101. FIG. 4 illustrates the tradeoff between the switch resistance and the capacitive loading of the switch, which results in significant inefficiency of the overall system. The tradeoff relates to switch size. Smaller switches offer higher conventional clock efficiency due to reduced loading, e.g., at 401 as compared to 403. Larger switches offer improved resonant clocking performance up to a certain point, e.g., at 407 as compared to 405. Thus, trying to achieve efficiency for one mode of operation, e.g. resonant clocking, sacrifices efficiency in the non-resonant mode of operation, and vice versa.

One existing solution to the inefficiency resulting from the tradeoff between the mode switch resistance and the capacitive loading offered to the clock network is to use low threshold voltage ($V_{th}$) devices. That technique, however, does not offer significant resistance reduction, especially at higher voltages where power efficiency is particular important to obtain improved performance. Another problem associated with the use of the modes switch is leakage current. Using a low on-resistance mode switch implies a higher leakage current through the mode switch when it is off. The use of low $V_{th}$ devices reduces the on/off current ratio, increasing the leakage through the mode switch when the switch is open. The higher leakage through the switch results in additional undesirable power dissipation.

Accordingly, some embodiments address the disadvantages of low Vth devices by improving the pareto-efficiency of the mode switch 104 by significantly reducing the on-resistance of the mode switch 104 for a given switch width. The reduced resistance can be used for improved efficiency in resonant mode, or be traded off for improved conventional mode clocking through mode switch width reduction. It also allows for reduced leakage through the mode switch when the switch is open.

Figure 5:
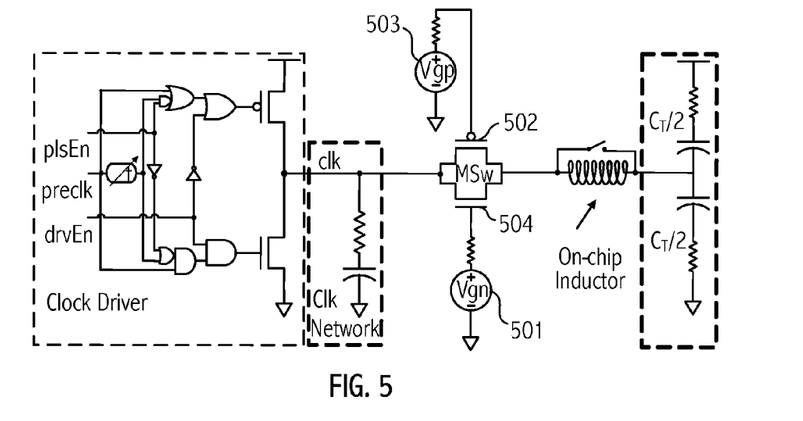
FIG. 5 illustrates a simplified schematic using high-impedance voltage sources to drive the gate terminals of the mode switch, according to some embodiments.

FIG. 5 shows a simplified schematic of an embodiment that reduces the on-resistance of the mode switch 104 for a given switch width and provides for reduced leakage through the mode switch when the switch is open. Instead of within-rail signals driving the gate of the mode switch 104, high impedance voltage sources, Vgn 501 and Vgp 503, are used to allow the gate voltage to transition along with the source/drain voltage of the mode switch 104. Use of the high impedance voltage sources allows for better pareto-efficiency with regard to the design of the mode switch 104. The use of the high impedance voltage source also allows the added benefit of reduced loading on the clock network while in conventional mode since the gate terminals can be thought of as floating terminals in the AC sense, and in the best-case scenario, the loading on the clock node goes from 2Cdg (as per FIG. 3) down to Cdg. The assumption is that Cdg is approximately equal to Csg. If the gate is floating and the mode switch is turned off, there are two parallel paths made up of two series capacitors. Each of these paths is approximately Cdg/2 in capacitance and thus, the resultant capacitance is Cdg.

Figure 6A:
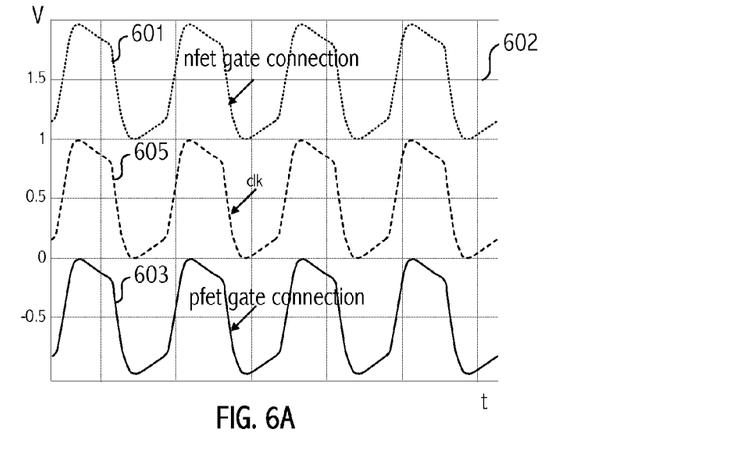
FIG. 6A shows nFET and pFET gate voltages with respect to clock voltage when the mode switch is closed, according to some embodiments.

FIG. 6A shows waveforms of the applied gate voltage of the nFET and the pFET device of the mode switch and the clock signal when the mode switch 104 is closed in resonant mode. Note how the gate signals 601 and 603 transition along with the clock signal 605 maintaining a near-constant gate overdrive in the conducting transistor, while ensuring that reliability limits are not exceeded. Nearly or substantially constant means that the gate overdrive voltage does not vary by more than, e.g., approximately 10% or less in a typical embodiment depending on the needs of the system. The amount of change in the gate overdrive depends on the impedance of the supply. If the supply impedance is infinitely high, the gate overdrive will actually be almost constant (e.g., less than 1% variation). As impedance gets lower, the gate voltage tracks the source/drain voltage less until ultimately, the gate voltage does not track the source drain voltage at all when the power supply has zero impedance. Thus, depending on the impedance, some embodiments may have gate overdrive that varies by more than 10% but the variation is sufficiently small to improve the conductivity of the mode switch.

Referring still to FIG. 6A, when using the high impedance voltage source, the gate voltage, e.g., shown in gate signal 601, tracks the clock signal 605. FIG. 6A shows the gate voltage transitioning in synchronism with the clock signal around the voltage level 602, which is supplied by the power supply Vgn 501. The gate signal tracks the clock signal due to the impedance seen by the source and drain into the gate, past the Cgd and Cgs (see FIG. 3). If for example the impedance was low, e.g., a zero impedance, then the gate would just be tied to that voltage, regardless of the gate and source voltage transitions. On the other hand, if the impedance is high, then a high pass filter is seen with Cgd and Cgs in series with the resistance of the supply. For high frequency clocks, nearly all the voltage is transferred to the gate node. Of course, with a high pass filter, if the clocks were really slow, a very large impedance would be needed for the supply voltage to allow the gate voltage the track.

Figure 6B:
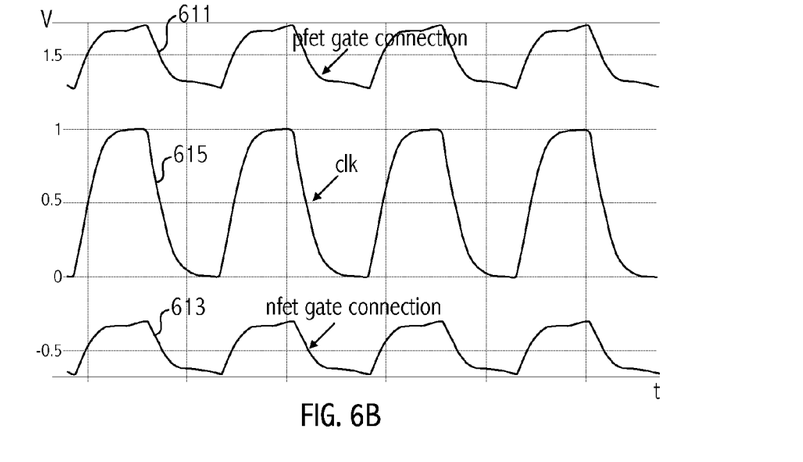
FIG. 6B shows nFET and pFET gate voltages with respect to clock voltage when the mode switch is open, according to some embodiments.

FIG. 6B shows the operation of the mode switch 104 with high impedance voltage sources when the mode switch 104 is open. Note that the gate signals 611 and 613 transition along with the clock signal 615 maintaining a near-constant gate overdrive in the conducting transistor, while ensuring that reliability limits are not exceeded. The use of the high impedance voltage sources dramatically reduces leakage while in the open state shown in FIG. 6B.

The high impedance voltage source can be generated by several techniques, one of which is the use of charge pumps to achieve the desired voltage levels. In addition, although FIG. 6A shows a DC level of 1.5Vdd for the gate voltage (Vgn) for the nFET and a DC level of −0.5Vdd for the gate voltage (Vgp) for the pFET, the appropriate voltage settings for the voltage supplies can be selected based on the requirements for a particular design. As shown in FIG. 6B, note that the voltage swing of waveforms 611 and 613 on the gate terminals is lower when the mode switch is open. That is expected since the side of the switch connected to the inductor does not toggle, and instead serves to reduce the amplitude of the coupled voltage. Consequently, the voltages $V_{gn}$, and $V_{gp}$ should be set according to reliability constraints.

Figure 7:
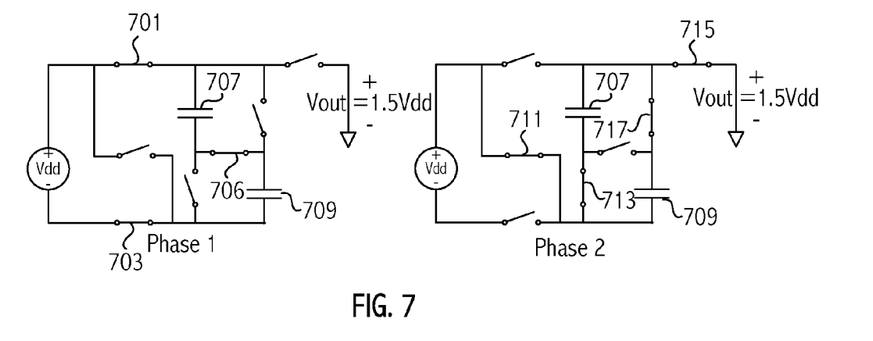
FIG. 7 illustrates an exemplary switched-capacitor implementation of a high impedance voltage generator to generate a gate voltage for a switch, according to some embodiments.
Figure 8:
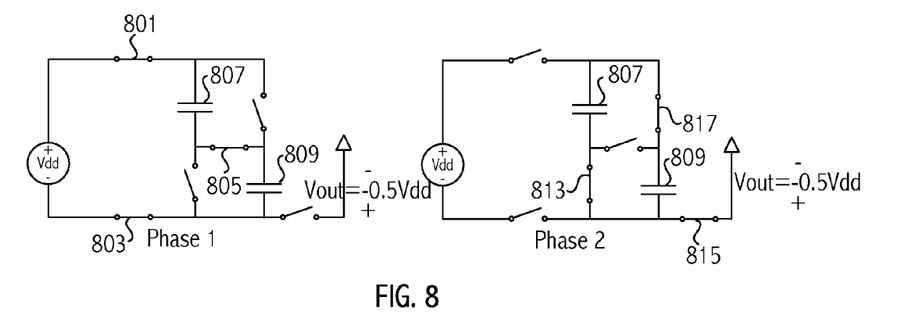
FIG. 8 illustrates an exemplary switched-capacitor implementation of a high impedance voltage generator to generate a gate voltage for a switch, according to some embodiments.

FIGS. 7 and 8 show, respectively, embodiments to achieve the voltages of 1.5 Vdd and −0.5 Vdd with a high output impedance. The charge pump embodiment of FIG. 7 utilizes a clock signal to alternate the open/closed state of the switches in phase 1 and phase 2 illustrated in FIG. 7. In phase one, switches 701, 703, and 706 are closed to charge capacitors 707 and 709, which are configured in series. In phase 2, switches 711, 713, 715, and 717 are closed configuring Vdd in series with the parallel capacitors 707 and 709, allowing a voltage to be supplied that is 1.5 Vdd. To achieve a higher output impedance, a lower frequency clock may be used to toggle the switches between the two phases because output impedance is inversely related to switch frequency.

FIG. 8 illustrates a charge pump embodiment that utilizes a clock signal to alternate the open/closed state of the switches in phase 1 and phase 2. In phase 1, switches 801, 803 and 805 are closed to charge capacitors 807 and 809 in series. In phase 2, switches 813, 815, and 817 are closed allowing a voltage to be supplied from capacitors 807 and 809 configured in parallel that is −0.5 Vdd. Of course, the particular voltage values in FIGS. 7 and 8 are exemplary and other voltage values may be chosen to be supplied according to the needs of the particular system.

Embodiments described herein offer several advantages including reduced on-resistance of the mode switch 104 while operating within reliability constraints of the device and increased off-resistance (lower leakage) of the mode switch 104 while operating within reliability constraints of the device. The dramatically lower leakage also allows for the use of even lower Vth devices for the mode switch while still avoiding substantial power loss through leakage current. Further, in conventional (non-resonant) mode, the use of a high-impedance gate driver for the mode switch reduces the capacitive loading on the clock node, allowing for improved energy efficiency.

Reduced on-resistance is achieved through the higher gate overdrive on both the nFET and the pFET devices of the mode switch 104. Reliability constraints are satisfied through the use of the high impedance voltage source, which allows the voltage of the source and drain to couple into the gate terminal, allowing it to transition along with the source/drain, thereby maintaining a substantially constant gate overdrive regardless of the clock voltage level.

When the mode switch 104 is open, the devices operate in deep-cutoff with drastically lower leakage as compared to conventional techniques. That improves energy efficiency of the clock system in conventional mode. In some embodiments, the high impedance power supplies are shared across a plurality of the mode switches. In some embodiments, the number of mode switches that share a high impedance power supply is determined according to system requirements such as the ability of the high impedance power supplies to supply a particular number of switches. Note also than when switching from resonant mode to non-resonant mode, the power supplies are switched by a switch (not shown in FIG. 5) so −0.5 Vdd goes to the nFET and 1.5 Vdd goes to pFET.

Figure 9:
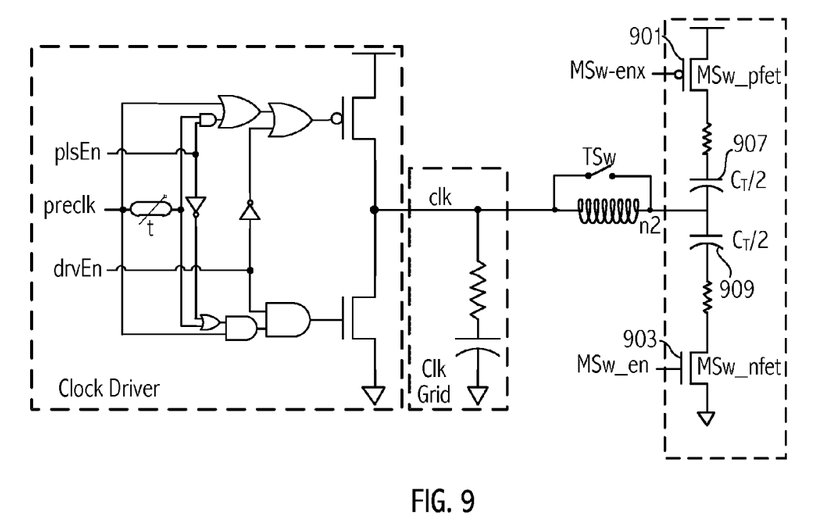
FIG. 9 illustrates an embodiment to achieve low conducting resistance based on the location of the mode switch.

Some embodiments address the problem of increased $I^2R$ losses due to the lower gate overdrive in the mode switch by relocating the mode switch 104 so that the nFET and pFET devices of the mode switch 104 conduct with a higher gate overdrive, and in doing so offer a lower conducting resistance for a given mode switch width. The higher overdrive is present when the pFET 901 is on in resonant mode since the drain and source voltages are near Vdd while the gate voltage is low. Similarly for pFET 903, the gate voltage is high while the source and drain are low.

FIG. 9 shows a simplified representation of such an embodiment. The mode switch is implemented as a header-footer combination using the pFET 901 and nFET 903. The FETs 901 and 903 are turned on in resonant mode and turned off in non-resonant mode. Note that the FETs 901 and 903 use with-in supply rail voltages in contrast to the FETS 502 and 504 shown in FIG. 5, which have boosted supply voltages from the charge pumps shown in FIGS. 7 and 8. Capacitors 907 and 909 may be included to ensure that the n2 node of inductor 101 is connected to ground in an AC sense. That avoids a DC drop across the inductor (which would lead to current buildup) so that node n2 takes on the natural DC value of the clock signal, and at the same time provides a very low impedance at the resonant frequency so that the inductor 101 and the clock network load look like a parallel LC tank circuit, with the capacitors 907 and 909 appearing like ground connections. The gate higher overdrive and lower conducting resistance achieved in the configuration illustrated in FIG. 9 is significantly better for a circuit using within supply rail voltages than the switch configuration shown in FIG. 1. The reduced conducting resistance may then be used to arrive at a more pareto-optimal tradeoff between conducting resistance of the mode switch and parasitic loading due to the mode switch.

While circuits and physical structures have been generally presumed in describing embodiments herein, it is well recognized that in modern semiconductor design and fabrication, physical structures and circuits may be embodied in a computer readable medium as data structures for use in subsequent design, simulation, test, or fabrication stages. For example, such data structures may encode a functional description of circuits or systems of circuits. The functionally descriptive data structures may be, e.g., encoded in a register transfer language (RTL), a hardware description language (HDL), in Verilog, or some other language used for design, simulation, and/or test. Data structures corresponding to embodiments described herein may also be encoded in, e.g., Graphic Database System II (GDSII) data, and functionally describe integrated circuit layout and/or information for photo-mask generation used to manufacture the integrated circuits. Other data structures, containing functionally descriptive aspects of embodiments described herein, may be used for one or more steps of the manufacturing process.

Computer-readable media include tangible computer readable media, e.g., a disk, tape, or other magnetic, optical, or electronic storage medium. In addition to computer-readable medium having encodings thereon of circuits, systems, and methods, the computer readable media may store instructions as well as data that can be used to implement embodiments described herein or portions thereof. The data structures may be utilized by software executing on one or more processors, firmware executing on hardware, or by a combination of software, firmware, and hardware, as part of the design, simulation, test, or fabrication stages.

The description of the embodiments set forth herein is illustrative, and is not intended to limit the scope of the invention as set forth in the following claims. For example, embodiments of the invention are not limited in scope to microprocessors. Rather, the solution described herein applies to integrated circuits in general. Other variations and modifications of the embodiments disclosed herein may be made based on the description set forth herein, without departing from the scope of the invention as set forth in the following claims.

What is claimed is:

1. An apparatus comprising:
   a switch coupled to receive a clock signal at an input node of the switch and supply the clock signal at an output node of the switch when the switch is closed;
   an inductor coupled in series with the switch, wherein when the switch is closed, a clock system is operable in a resonant mode and when the switch is open the clock system is operable in a non-resonant mode;
   a first high impedance voltage source coupled to supply a first voltage to a first gate node of a first transistor of the switch; and
   a second high impedance voltage source coupled to supply a second voltage to a second gate node of a second transistor of the switch.

2. The apparatus as recited in claim 1 wherein a first gate voltage at the first gate node transitions around the first voltage in accordance with the clock signal.

3. The apparatus as recited in claim 2 wherein the transitions of the first gate voltage around the first voltage in accordance with the clock signal are greater when the switch is closed.

4. The apparatus as recited in claim 1 wherein a second gate voltage at the second gate node transitions around the second voltage in accordance with the clock signal.

5. The apparatus as recited in claim 4 wherein the transitions of the second gate voltage around the second voltage in accordance with the clock signal are greater when the switch is closed.

6. The apparatus as recited in claim 1 wherein a near constant gate overdrive voltage is maintained for the first gate node and a second near constant gate overdrive voltage is maintained for the second gate node.

7. The apparatus as recited in claim 1 wherein the first high impedance voltage source comprises a switched capacitor circuit.

8. The apparatus as recited in claim 7 wherein the switched capacitor circuit is clocked by a second clock signal slower than the clock signal supplied to the switch in the resonant mode of operation.

9. The apparatus as recited in claim 1 wherein the switch comprises a p-channel field effect transistor and an n-channel field effect transistor.

10. A method comprising:
    supplying a first voltage from a first high impedance voltage source coupled to a gate of a first transistor of a switch;
    supplying a second voltage from a second high impedance voltage source coupled to a gate of a second transistor of the switch; and
    supplying a clock signal to respective first current carrying nodes of the first and second transistors and supplying the clock signal from respective second current carrying nodes of the first and second transistors to an inductor when the switch is closed.

11. The method as recited in claim 10 further comprising:
    operating a clock system in a resonant mode with the switch formed by the first and second transistors closed and operating the clock system in a non-resonant mode with the switch open.

12. The method as recited in claim 10 wherein a gate voltage at the gate of the first transistor transitions around the first voltage in accordance with transitions of the clock signal.

13. The method as recited in claim 11 wherein a voltage swing of the gate voltage around the first voltage is greater with the switch closed than with the switch open.

14. The method as recited in claim 10 further comprising maintaining a substantially constant gate overdrive voltage at the gate of the first transistor.

15. The method as recited in claim 10 further comprising supplying the first voltage from a switched capacitor circuit.

16. The method as recited in claim 15 further comprising supplying a second clock signal to the switched capacitor circuit that is slower than the clock signal supplied to the switch in resonant mode of operation.

17. An integrated circuit comprising:
    a switch including a first and second transistor, the switch coupled to receive a clock signal and supply the clock signal to an inductor when the switch is closed;
    the inductor forming a resonant circuit with capacitance of a clock system of the integrated circuit when the switch is closed and is disconnected from the capacitance of the clock system when the switch is open; and
    first and second high impedance voltage sources to supply respective first and second voltages to the switch such that a first near constant overdrive voltage is maintained for a first gate node of the first transistor and a second near constant gate overdrive voltage is maintained for a second gate node of the second transistor.

18. The integrated circuit as recited in claim 17 wherein a gate voltage at the first gate node transitions around the first voltage in synchronism with the clock signal and a gate voltage at the second gate transitions around the second voltage in synchronism with the clock signal.

19. The integrated circuit as recited in claim 18 wherein the transitions at the first gate node are larger when the switch is closed than when the switch is open.

20. A non-transitory computer-readable medium storing a computer readable data structure encoding a functional description of an integrated circuit, the integrated circuit comprising:
    a switch including a first and second transistor, the switch coupled to receive a clock signal at a first node of the switch and supply the clock signal at a second node of the switch when the switch is closed;
    an inductor in series with the switch coupled to receive the clock signal when the switch is configured to be closed, the inductor forming a resonant circuit with capacitance of the clock system; and
    first and second high impedance voltage sources to supply respective first and second voltages to the switch such that a first near constant overdrive voltage is maintained for a first gate node of the first transistor and a second near constant gate overdrive voltage is maintained for a second gate node of the second transistor.

21. An integrated circuit comprising:
    an inductor; and
    a first circuit to selectively couple the inductor to a clock system, wherein the first circuit comprises a first transistor coupling a first terminal of the inductor to a first supply voltage and a second transistor coupling the first terminal of the inductor to a second supply voltage, wherein the first and second transistors are turned on in resonant mode to couple the inductor to the clock system and turned off in non-resonant mode to decouple the inductor from the clock system, wherein the clock system is operable in the resonant and non-resonant modes.

22. The integrated circuit as recited in claim 21 further comprising:
a first capacitor coupled at a first node of the first capacitor to the first terminal of the inductor and coupled at a second node of the first capacitor to the first transistor; and
a second capacitor coupled at a first node of the second capacitor to the first terminal of the inductor and coupled at a second node of the second capacitor to the second transistor.

* * * * *